Oct. 20, 1936.  A. L. R. BERNARD  2,057,758
PISTON
Filed July 27, 1935
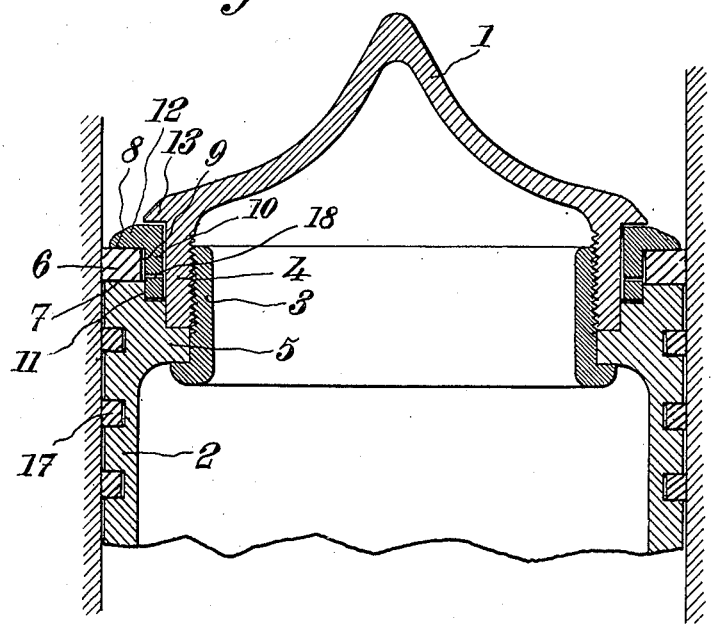
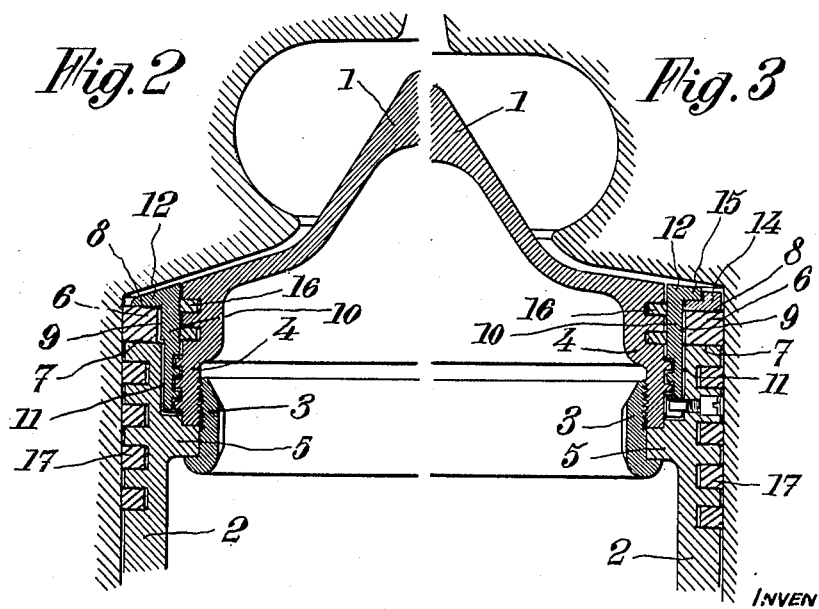
INVENTOR:
Auguste Louis René Bernard, deceased
Renée Bernard, née Bournonville,
By  Executrix
Attorneys:

Patented Oct. 20, 1936

2,057,758

UNITED STATES PATENT OFFICE 2,057,758

PISTON

Auguste Louis René Bernard, deceased, late of Rueil-Malmaison, France, by Renée Bernard, née Bournonville, executor, Paris, France Application July 27, 1935, Serial No. 33,614
In Belgium August 1, 1934

9 Claims. (Cl. 309—29)

The present invention relates to pistons of the kind in which fluidtightness with respect to the wall of the cylinder in which the piston is moving is obtained by means of expansible packing members, such as split rings. The invention is more especially, although not exclusively, concerned with pistons of this kind for internal combustion engines.

The object of the present invention is to provide a piston of this kind which is better adapted to meet the requirements of practice and, in particular, which is so devised that the packing rings are no longer subjected, under the effect of the high pressures acting on said pistons, to exaggerated radial efforts applying them against the wall of the cylinder and involving a rapid wear and tear of said cylinder.

The essential feature of the present invention consists in providing a piston of the type above referred to with an expansible packing ring mounted inside a groove the walls of which are capable of undergoing relative displacements with respect to one another substantially in the direction of the axis of the piston, in such manner that, under the effect of the high pressure existing in the cylinder, said walls tend to move toward each other and compress the packing ring between them thus preventing said pressure from penetrating into the groove.

Other features of the present invention will result from the following detailed description of some specific embodiments thereof.

Preferred embodiments of the present invention will be hereinafter described with reference to the accompanying drawing, given merely by way of example, and in which:

Fig. 1 is an axial sectional view of a piston for an internal combustion engine made according to the present invention;

Figs. 2 and 3 are half sections of pistons for internal combustion engines made according to two other embodiments of the invention, respectively.

Assuming, for instance, that the internal combustion engine is of the Diesel type, that is to say has a relatively high ratio of compression, the piston according to the present invention has the following structure:

The general arrangement of the piston may be of any kind whatever permitting the fitting of one or more packing members of the type above referred to. However, it seems to be particularly advantageous, for the mounting of the special elements that will be hereinafter described, to provide a piston made of several parts capable of being easily assembled together. For instance, as shown in the drawing, the piston includes a head 1 adapted to be rigidly assembled to a skirt 2, for instance by screwing. Preferably, as shown by way of example in the drawing, these two parts of the piston are assembled together by means of a nut 3 adapted to be screwed inside a cylindrical collar 4 carried by the piston head 1, so as to apply said collar against a flange 5 integral with the skirt 2 of the piston.

The means for ensuring fluid-tightness between the piston and the inner wall of the cylinder include at least one expansible packing member, such for instance as a split ring 6, mounted in a groove the walls of which pertain to at least two parts capable of undergoing certain relative displacements with respect to each other, substantially in the direction of the axis of the piston, said parts being so arranged that, under the effect of a high pressure inside the cylinder, they tend to move toward each other so as to compress the lateral faces of the packing ring, thus preventing said pressure from penetrating into said groove.

According to the embodiments shown by the drawing, this groove is devised in such manner that its lower lateral wall 7 is carried by the piston proper, that is to say by the skirt 2 of said piston, said wall of the groove consisting advantageously of the upper edge of said skirt 2, whereby the machining, and even the grinding thereof, is easily performed.

As for the other lateral wall of the groove, to wit the upper wall 8 of said groove, and also the bottom 9 of said groove, they are carried by a member capable of undergoing certain axial displacements with respect to the piston, said member being arranged in such manner that the pressure inside the cylinder tends to apply the member in question laterally against the packing ring, which is thus compressed between walls 7 and 8, whereby said pressure in the cylinder is, for practical purposes, prevented from penetrating to the inner cylindrical wall of the packing ring.

Consequently, according to preferred embodiments of the invention, the piston proper being made as above explained, this axially movable member consists of a closed ring, advantageously made of stainless steel and of L-shaped cross section.

Said member includes, on the one hand, a cylindrical part 10, coaxial with the piston and adapted to be fitted freely around the collar 4 of the piston head, with, for instance, a play ranging between 0.2 mm. and 0.3 mm. (in the radial direction) between these two parts 4 and 10. The outer cylindrical wall of said element 10 constitutes, over a portion of its height, the bottom 9 of the groove. The lower portion of said part 10 is engaged, over a suitable height, for instance a height equal to that of a packing ring, in an annular groove provided between collar 4 and a cylindrical edge 11 adjacent to wall 7, a play of, say, 0.01 mm. (still in the radial direction) being provided between walls 9 and 11.

Said axially movable member further includes an annular flange 12 extending in the outward direction, the wall 8 of said flange which is turned toward the inside of the groove in which packing member 6 is to be housed being adapted to fit in a fluidtight manner on the corresponding face of said packing ring.

In order to maintain this ring-shaped member in position while allowing it to move axially in the desired manner, either of the following arrangements may be employed:

In the embodiment shown by Fig. 1, the piston head includes an annular flange 13 which partly covers said ring 12 and the whole is devised in such manner that, after the parts have been assembled together, there remains, between this flange and the upper edge of ring 12, a play of, say, 0.2 mm.

In the embodiment of Fig. 2 and in that of Fig. 3, cylindrical part 10 is inwardly threaded on a portion of its height, for instance the lower half thereof, the threads being, for instance of square or slightly trapezoidal cross section. The corresponding portion of the outer wall of collar 4 is provided with threads of the same shape and pitch, a longitudinal play of, say, 0.2 mm, being provided between the threads of the two parts, and means, such for instance as a lug (Fig. 3), being provided for preventing, after the parts have been assembled, member 10 from unscrewing.

Of course these arrangements are given merely by way of example and the invention is not limited to these specific features. For instance a bayonet joint might also be used.

It will be readily understood that, in the case of arrangements corresponding to the last mentioned embodiments (Figs. 2 and 3), it is unnecessary to provide the piston head with a flange such as 13 (Fig. 1). On the contrary, ring 12 shall be so shaped that its external surface prolongs that of the piston head.

In the embodiment of Fig. 2, this ring 12 is of wedge-shaped cross section in order that, in the case of an engine provided with ports, the feed may be controlled by the upper edge of the first packing ring 6.

On the contrary, in the embodiment of Fig. 3, the upper face of ring 12 is substantially at right angles to the axis of the piston, so that said ring has a certain thickness at its periphery.

Besides, it should be noted that the whole of the piston head, collar 4, and the piston skirt might consist of a single element.

In any case, and whatever be the means that are made use of for keeping ring 10—12 in position, ring-shaped flange 12 may be made of two parts, as shown in Fig. 3, wall 8 being, in this case carried by a ring 14 (which, preferably, is not a split ring) disposed immediately above split ring 6.

When the piston head does not include a flange 13, the upper part of element 10 is preferably provided, as shown by Fig. 3, with an external flange 15, preferably of an outer diameter smaller than that of the piston, the whole being designed in such manner that, after the parts have been assembled together, the upper face of this flange 15 is flush with the upper surface of the piston head and is, preferably, located at the level of the upper edge of ring 14 (for this purpose, the upper portion of said ring 14 shall be provided with a suitable annular housing).

Whatever be the specific arrangement that is chosen, above split ring 6 there will be provided a non-split ring (element 8) the upper face of which is flush with the upper surface of the piston head at the periphery thereof, said non-split ring being capable of coacting with the ports of the cylinder for controlling the feed to the cylinder.

In any case, these non-split ring and split ring shall be strongly applied against each other when ring 12 is pushed downwardly and on the contrary there shall be a total play of, say, 0.2 mm. between them when ring 12 is moved upwardly.

Preferably, in order to prevent gas leakage as might take place between element 10 and the piston, or, more accurately, part 4 of said piston, one of these parts may be provided with packing rings 16 adapted to be applied against the other part after the whole is assembled together (Figs. 2 and 3).

These packing rings are, for instance, carried by the outer face of collar 4 so as to be applied against the upper part of the inner wall of element 10.

Advantageously, these packing rings are so devised as to be applied very strongly against the opposite part, this being not objectionable since no important relative displacement is to take place between the parts.

It is then possible to provide, between walls 9 and 11, a more considerable play as if packing rings 16 did not exist, for instance a play of 0.2 mm.

Finally, concerning the depth of the groove left between the elements above mentioned, which groove is intended to receive packing ring 6, said groove is so dimensioned as to leave a certain play, of for instance 0.3 mm., between the inner face of the packing ring 6 and the bottom 9 of the groove.

The piston according to the present invention, as above described, has the following advantages:

Considering this piston during its compression stroke, it may be assumed, in the application that is considered, that the combined effects of pressure and inertia tend to maintain said ring-shaped element 10—12 constantly applied against the packing ring. This is due to the fact that the pressure is sufficiently high, during the last portion of the stroke, for overcoming the effect of inertia, which then acts in the opposite direction, that is to say in the direction tending to move said parts away from each other.

The same conditions are maintained during the expansion stroke, or at least during the first part of said stroke.

Consequently, the packing ring is wholly protected against the detrimental action of high pressures during compression, igniting, and expansion since the inside of the groove is then cut off from the inside of the cylinder. As a matter of fact, the gases under high pressure cannot penetrate into the bottom of the groove, neither between the packing ring and wall 8 nor between flange 11 and wall 9.

This arrangement does not prevent the packing ring from playing its normal part due to its elasticity since, for some positions of the piston, for instance at mid-stroke during compression, the force applying element 10—12 against the packing ring shall be relatively small. Furthermore, in the case of a four-stroke engine, the packing ring shall be quite free during considerable portions of the inlet and exhaust strokes. This packing ring shall therefore be placed under conditions in which it is capable of ensuring fluid tightness between the piston and the cylinder.

It should further be noted that ring-shaped member 10—12 also acts as a screen with respect to the packing ring and protects it against the effects of high temperatures.

I may eventually provide, at the periphery of the piston and below packing ring 6, ordinary packing rings 17 which, as a matter of fact, are wholly protected against the action of high pressures.

It should also be understood that more than one packing ring such as 6 might be provided in the groove.

Finally, it may be useful, in some cases, instead of wholly cutting off the connection between the inside of the groove and the cylinder, to admit gases at a certain pressure into said groove, for instance with a view to scavenging the deposits that might have accumulated at the bottom of said groove, according to a feature already described, for instance, in my Belgian Patent No. 315,335 of June 15, 1934. For instance, in order to obtain this result, member 10 is provided with one of several passages 18, of very small section, of radial or oblique direction. Of course, when packing rings 16 are provided, passages 18 must be located above said packing rings.

It stands to reason that the invention is also applicable to explosion engines.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A piston for use in a cylinder, comprising, in combination, a piston body including a piston head and a piston skirt rigid with said piston head and provided with an annular shoulder in its periphery, at least one annular circumferentially continuous structure movable axially with respect to said piston skirt forming an annular part of the face of the piston head and forming an annular groove between itself and said shoulder, said structure including an annular member of L-shaped section, one of the branches of the L comprising a cylindrical portion which forms, for at least a portion of its length, the bottom of said groove, and the other branch being parallel to the lateral inner wall of the groove opposed to said shoulder, and at least one split metallic packing ring mounted in said annular groove, the coacting surfaces forming the lateral inner walls of said groove and the lateral walls of said packing ring respectively lying in planes vertical to the axis of the cylinder, whereby said annular member is moved toward said ring by the pressure of the gases in said cylinder so as to clamp said packing ring between said shoulder and said annular member.

2. A piston according to claim 1, including packing means between the inner surface of the cylindrical portion of said annular member and the piston body.

3. A piston according to claim 1 in which said piston head and said piston skirt are provided with a cylindrical groove coaxial with said piston therebetween, the end of the cylindrical portion of said annular member being mounted in said last mentioned groove.

4. A piston according to claim 1 further including a cylindrical part integral with said piston head and fitting coaxially in the cylindrical part of said annular member and packing rings mounted in one of said cylindrical parts and bearing against the other cylindrical part.

5. A piston according to claim 1 having an outwardly extending flange on the peripheral portion of said piston head partially overlapping the annulus-shaped portion of said annular member and spaced axially therefrom.

6. A piston according to claim 1 having a cylindrical part integral with said piston head fitting coaxially in the cylindrical part of said annular member and slightly spaced therefrom and coacting threads on the adjacent faces of said cylindrical parts, said threads permitting a limited axial play of said cylindrical parts with respect to each other.

7. A piston according to claim 1 having a ring-shaped member interposed between the inner face of the annulus-shaped part of said annular member and said packing ring.

8. A piston according to claim 1 having a ring-shaped member interposed between the inner face of the annulus-shaped part of said annular member and said packing ring, said ring-shaped member projecting beyond the peripheral edge of said annulus-shaped part so as to be substantially at the same level as the upper face thereof, the upper face of said annular member being substantially flush with the outer face of said piston head.

9. In a piston according to claim 1, said cylindrical part of the annular member having passages of small section therethrough, whereby to admit gases at a limited pressure into the bottom of said groove.

RENÉE BERNARD, née BOURNONVILLE,
*Executor of Auguste Louis*
*René Bernard, Deceased.*